(12) United States Patent
Elferich et al.

(10) Patent No.: US 12,439,487 B2
(45) Date of Patent: Oct. 7, 2025

(54) HF AC DRIVING A STRING OF ANTIPARALLEL LASER DIODES AND LEDS

(71) Applicant: SIGNIFY HOLDING B.V., Eindhoven (NL)

(72) Inventors: Reinhold Elferich, Aachen (DE); Olexandr Valentynovych Vdovin, Maarheeze (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 108 days.

(21) Appl. No.: 18/572,360

(22) PCT Filed: Jun. 13, 2022

(86) PCT No.: PCT/EP2022/066021
§ 371 (c)(1),
(2) Date: Dec. 20, 2023

(87) PCT Pub. No.: WO2023/274702
PCT Pub. Date: Jan. 5, 2023

(65) Prior Publication Data
US 2024/0306274 A1    Sep. 12, 2024

(30) Foreign Application Priority Data
Jun. 29, 2021   (EP) .................................... 21182300

(51) Int. Cl.
*H05B 35/00* (2006.01)
*H02M 3/00* (2006.01)
*H05B 45/20* (2020.01)

(52) U.S. Cl.
CPC .............. *H05B 35/00* (2013.01); *H02M 3/01* (2021.05); *H05B 45/20* (2020.01)

(58) Field of Classification Search
CPC ........ H05B 35/00; H05B 45/20; H05B 45/42; H05B 45/39; H02M 3/01; H02M 1/123; H02M 1/4225
See application file for complete search history.

(56) References Cited

U.S. PATENT DOCUMENTS 5,323,305 A     6/1994  Ikeda et al.
2003/0012524 A1  1/2003  Nasu et al.
(Continued)

FOREIGN PATENT DOCUMENTS

CN    103249211 A  *  8/2013  ............. H05B 45/35
CN    104717784 A  *  6/2015  ............. H05B 45/46
(Continued)

*Primary Examiner* — Abdullah A Riyami
*Assistant Examiner* — Syed M Kaiser (57) ABSTRACT

The invention relates to a lighting system comprising a parallel resonant converter comprising an input node for receiving a bus voltage an output node a half bridge comprising a first switch coupled between the input node and a switching node and a second switch coupled between the switching node and a return node. The parallel resonant converter further comprises a controller adapted to provide a first control signal to the first switch and a second control signal to the second switch an inductor coupled between the switching node and the output node. The lighting system further comprises a load comprising a first load part, the first load part comprising a first lighting load a capacitor coupled in parallel with the first lighting load and a second lighting load coupled in anti-parallel with the first lighting load, wherein the load further comprises: a third lighting load and a fourth lighting load, coupled in anti-parallel with the third lighting load, wherein the third lighting load and the fourth lighting load are coupled in series with the first load part.

13 Claims, 10 Drawing Sheets

(56) References Cited

U.S. PATENT DOCUMENTS

| | | | |
|---|---|---|---|
| 2003/0043611 A1* | 3/2003 | Bockle | H05B 45/10 |
| | | | 363/131 |
| 2003/0122502 A1 | 7/2003 | Clauberg et al. | |
| 2007/0024254 A1 | 2/2007 | Radecker et al. | |
| 2012/0287678 A1 | 11/2012 | Xu et al. | |

FOREIGN PATENT DOCUMENTS

| | | | | |
|---|---|---|---|---|
| DE | 102006022819 A1 * | 1/2007 | | H02M 7/537 |
| WO | WO-2015050639 A1 * | 4/2015 | | H05B 45/44 |

* cited by examiner

HF AC DRIVING A STRING OF ANTIPARALLEL LASER DIODES AND LEDS

CROSS-REFERENCE TO PRIOR APPLICATIONS

This application is the U.S. National Phase application under 35 U.S.C. § 371 of International Application No. PCT/EP2022/066021, filed on Jun. 13, 2022, which claims the benefit of European Patent application Ser. No. 21/182,300.0, filed on Jun. 29, 2021. These applications are hereby incorporated by reference herein.

FIELD OF THE INVENTION

The invention relates to a lighting system.

BACKGROUND OF THE INVENTION

Laser based light sources are gathering much interest due to their potential in producing extremely high intensities with smaller light emitting areas. A high brightness generated by these sources allows for miniaturization of the light source and a luminaire and also more precise control of light distribution with optics. Typically, existing laser light sources consist of a blue pumping laser and a phosphor converter element, which results in a white light source with limited color rendering (CRI~70). In order to increase the CRI of the laser-based phosphor-converted source an additional red laser can be used to increase red spectral content. This would require a more advanced multi-channel driver to control the source color point and the CRI.

Alternatively, multiple primary color lasers can be used to make white light (e.g. RGB or RGBY combinations), which still require a multi-channel driver to control the source color point and the CRI. To further improve the light source quality, special spectral light compositions might be desired (e.g. increase of cyan light content to increase a melanopic daylight efficacy ratio, MDER factor, stimulate visual and biological effects of natural light, circadian biorhythms etc.). All the source combinations mentioned above would require multi-channel drivers and with the corresponding wiring. A drawback of the multi-channel driver is that more connections are needed between the driver and the load and that a more complex control of the driver is needed.

SUMMARY OF THE INVENTION

It is an objective of the invention to provide a driver that can provide a current to a load in a simple way.

To provide a driver that can be controlled in a simple way and also provide a power to multiple loads, in a first aspect of the invention a lighting system is provided. The lighting system comprises:
 a parallel resonant converter comprising:
  an input node for receiving an input voltage;
  an output node;
  a half bridge comprising:
   a first switch coupled between the input node and a switching node; and
   a second switch coupled between the switching node and a return node;
   a controller adapted to provide a first control signal to the first switch and a second control signal to the second switch; and
   an inductor coupled between the switching node and the output node;
 a load comprising a first load part, the first load part comprising:
  a first lighting load;
  a capacitor coupled in parallel with the first lighting load; and
  a second lighting load coupled in anti-parallel with the first lighting load.

The lighting system according to the invention provides a parallel resonant converter that is coupled to the load. The load has a first lighting load and a second lighting load in anti-parallel with the first lighting load. A capacitor is placed in parallel to the first and second lighting loads. The parallel resonant converter provides a current to the first and second load and the capacitor. The first and second switch are controlled by a controller, which provides a control signal to each respective switch. The control of the switches determines the amount of current that is provided to the load. Now that a capacitor is placed in parallel to the first and second lighting load, the current that flows through the first lighting loads has become frequency dependent. For example, an increase in a frequency of the control signals of the switches will result in a reduced impedance of the capacitance with respect to the impedance of the first and second lighting loads. This results in a current distribution where more current will flow through the capacitor and less current through the first and second lighting loads. A reduction of the frequency of the control signals of the switches will result in an increased impedance of the capacitance with respect to the impedance of the first and second lighting loads. This results in a current distribution where less current will flow through the capacitor and more current through the first and second lighting loads.

Another benefit with common implementations of a parallel resonant converter is that the parallel resonant converter can be constructed in a much smaller and simpler design. A parallel resonant converter generates an AC output voltage to the load. In a common parallel resonant converter, this AC output voltage is rectified using a rectifier at e.g. the output of a transformer present in the parallel resonant converter. This allows a lighting load to be powered with a DC voltage. The load according to the invention is capable of directly using the AC voltage generated by the parallel resonant converter. By placing the first and second lighting loads in parallel with the capacitor, the first lighting load will for example use the positive cycle of the AC output voltage generated by the parallel resonant converter and the second lighting load will use the negative cycle of the AC output voltage. In addition, the capacitor is used as a part of the resonant tank of the parallel resonant converter. The parallel resonant converter needs a resonant tank, which is coupled to the switching node, to provide an AC output voltage and requires at least an inductor and a capacitor coupled in series with the inductor. In this situation, the capacitor serves two purposes, to regulate the operation of the parallel resonant converter and to provide a frequency dependent load current.

In a further example, the controller is arranged to control a frequency of the first control signal and the second control signal while keeping a duty cycle of the first control signal and the second control signal constant.

Preferably, the duty cycles of the control signals are controlled to remain constant and only the frequencies of the control signals are controlled. This allows the current through both lighting loads to be equally changing based on the frequency.

In a further example, the duty cycle of the first control signal and the second control signal is set at 0.5.

Preferably, the duty cycles of the control signals are set at 0.5 so that the first and second lighting loads receive the same amount of current.

In a further example, the controller is arranged to control a duty cycle of the first control signal and the second control signal.

Because of the simplicity of the design of the parallel resonant converter, the first and second lighting loads can be provided with a similar current and/or with a current that is different from the current provided to the other lighting load. If the duty cycle of the control signals of the first and second switches differs from each other, the positive and negative voltages, forming the AC output voltage to the lighting loads, will differ from each other. This means that the first lighting load may receive a current that is different from the current provided to the second lighting load. The light that is outputted by the first lighting load is different will then be different in intensity compared to the intensity provided by the second lighting load.

In a further example, the load further comprises:
- a third lighting load;
- a fourth lighting load, coupled in anti-parallel with the third lighting load, wherein the third lighting load and the fourth lighting load are coupled in series with the first load part.

In addition to the first and second lighting loads, a third and fourth lighting load can be introduced. The third and fourth lighting loads are coupled in anti-parallel to each other and in series with the first load part, which comprises the first and second lighting load and the capacitor. The third and the fourth lighting loads may not have a capacitor in parallel. This results in the first and second lighting loads to have a current provided that depends on the frequency of the first and second control signals, while the third and fourth lighting loads will receive the current that is provided via the first load part without having the capacitive current distribution that occurs between the first and second lighting loads and the capacitor.

In a further example, the first lighting load provides a first color or color temperature and the second lighting load provides a second similar color or similar color temperature.

Preferably, especially with a duty cycle of 0.5 for the control signals, the first and second lighting loads generate the same color or color temperature.

In a further example, the first lighting load provides a first color and/or a first color temperature and the second lighting load provides a second color which is different from the first color and/or a second color temperature which is different from the first color temperature.

Alternatively, the first and second lighting loads can provide different colors or color temperatures. Controlling the duty cycles of the first and second control signals may provide a change in the color or color temperature of the overall light generated by the lighting system.

In a further example, the third lighting load provides a first color or color temperature and the fourth lighting load provides a second similar color or similar color temperature.

The third and the fourth lighting loads may provide a similar color or color temperature. For example, the third and fourth lighting loads could generate white light, while the first and second lighting loads generate other colors of light such as red, green or blue.

In a further example, the third lighting load provides a first color and/or a first color temperature and the fourth lighting load provides a second color which is different from the first color and/or a second color temperature which is different from the first color temperature.

Alternatively, the third and fourth lighting loads can provide different colors or color temperatures so that the lighting system can provide a wider range of colors and color temperatures.

In a further example, the first lighting load and second lighting load comprise light emitting diodes, LEDs.

Preferably, the first and second lighting loads are LEDs, which are, when coupled in anti-parallel, well suited for receiving an AC voltage such as provided by the parallel resonant converter.

In a further example, the third lighting load and the fourth lighting load comprise laser elements.

Preferably, the third and fourth lighting loads are laser element. Using laser elements allows the lighting system to provide a high light output using a small lighting system. In addition with the first and second lighting loads, the laser elements have an improved protection against voltage spikes. The first load part reduces the voltage spikes, which will then not occur at the laser elements.

In a further example, wherein the parallel resonant converter further comprises a further half bridge comprising:
- a third switch between the input node and a further switching node; and
- a fourth switch coupled between the further switching node and the return node,
- wherein the further switching node is coupled to a second input,
- wherein the controller is adapted to provide a third control signal to the third switch and a fourth control signal to the fourth switch.

The parallel resonant converter is now provided with a full bridge switching circuit instead of a half bridge switching circuit. This allows the control of the resonant tank to be different by controlling four switches and also results in that a DC blocking capacitor is not required.

In a further example, the parallel resonant converter further comprises:
- a first DC blocking capacitor coupled between the inductor and the switching node;
- a second DC blocking capacitor coupled between the second input and the return node.

The DC blocking capacitor can be split up in two capacitors, so that they provide a galvanic isolation between the input of the lighting system and the load.

In a further example, the lighting system comprises a pre-converter adapted to:
- receive a voltage from an external power source;
- convert the voltage to the bus voltage such that the bus voltage is a regulated bus voltage;
- provide the regulated bus voltage to the input node as the bus voltage.

The pre-converter can be placed between a power source and the parallel resonant converter. The pre-converter may be used to provide a power factor correction if the power source is mains. The pre-converter may further be used to provide a regulated bus voltage this voltage can be provided to the parallel resonant converter. the regulation of the bus voltage may have beneficial effects as will be described in the detailed description chapter.

In a further example, the pre-converter is adapted to regulate the bus voltage such that the current provided to the inductor is constant independent of a frequency change of the first control signal and the second control signal.

The pre-converter can regulate the bus voltage such that the changing in the frequency of the control signals, the current distribution will still change between the first and second lighting loads and capacitor when the frequency of the control signals changes, but the overall power may be maintained constant or change differently by changing the bus voltage together with the frequency of the control signals.

BRIEF DESCRIPTION OF THE DRAWINGS

Examples of the invention will now be described with reference to the accompanying drawings, in which.

DETAILED DESCRIPTION OF THE EMBODIMENTS

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should also be understood that the Figures are merely schematic and are not drawn to scale. It should also be understood that the same reference numerals are used throughout the Figures to indicate the same or similar parts.

Figure 1:
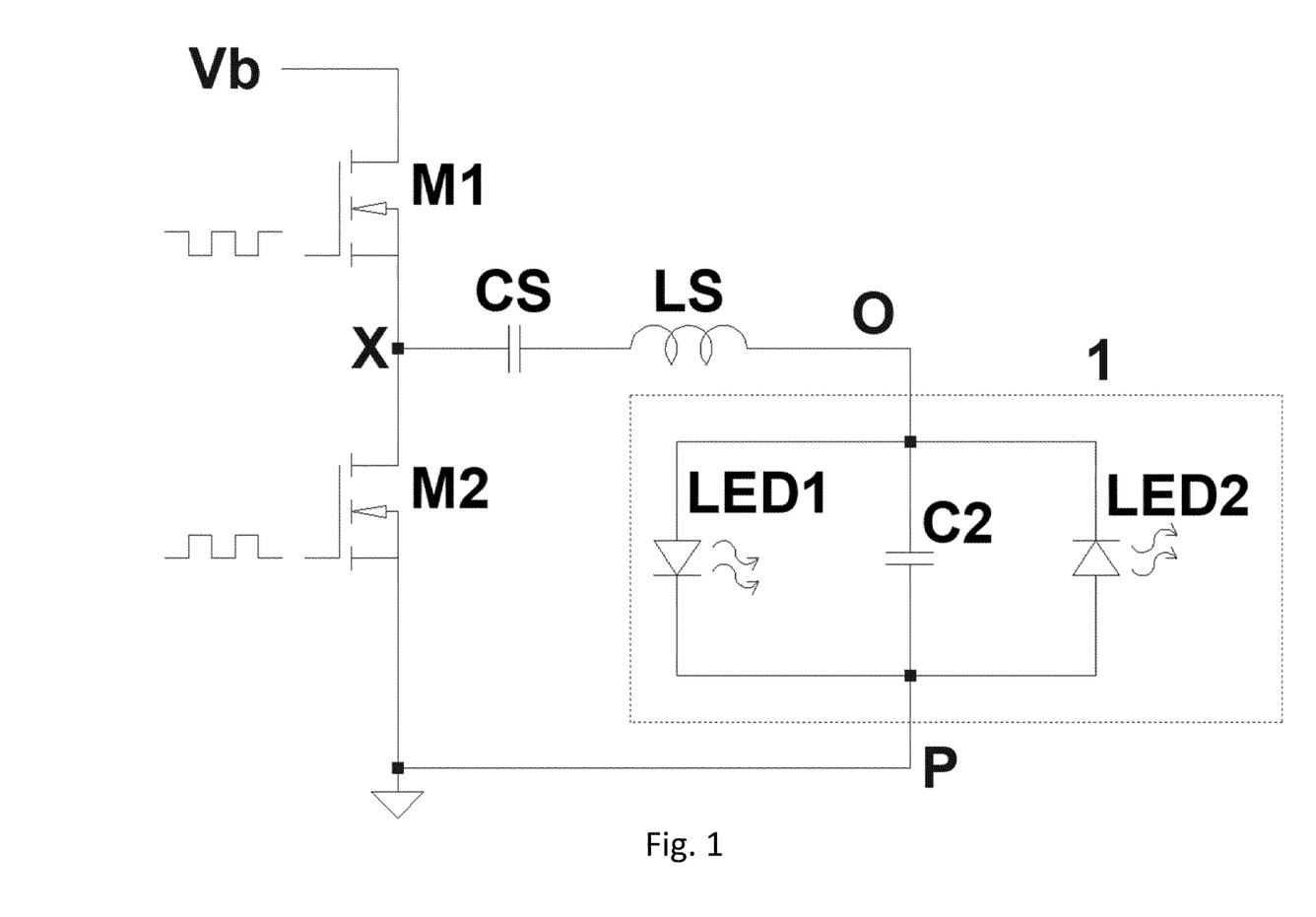
FIG. 1 shows an example of a lighting system according to the invention.

FIG. 1 shows an example of a lighting system. The lighting system has a converter in the form of a parallel resonant converter. The parallel resonant converter has an input node at which the parallel resonant converter receives a bus voltage Vb. The ground reference in the figure represents the return node. A half bridge is coupled to the input node. The half bridge has a first switch M1 coupled between the input node X and a switching node and a second switch M2 coupled between the switching node X and the return node. In this example, a DC blocking capacitor CS is coupled between the switching node X and an inductor LS. The position of the capacitor CS and the inductor LS can of course be exchanged. The inductor LS is coupled between the DC blocking capacitor CS and an output node O. The output node O can be connected to the load 1. The load 1 has a first lighting load LED1 and a second lighting load LED2. In anti-parallel to this first lighting load LED1 is a second lighting load LED2 connected. In parallel to the first lighting load LED1 and the second lighting load LED2 is a capacitor C2 connected. The capacitor C2 and the inductor LS form the resonant tank for the parallel resonant converter. The capacitor C2 is coupled in parallel with the lighting load, which is in this example the first lighting load LED1 and the second lighting load LED2. In the example provided, the capacitor C2 forms a part of the load 1, but it can be understood that the capacitor C2 may also form part of the parallel resonant converter.

A controller is provided to control the first switch M1 and the second switch M2. The controller provides a first control signal for the first switch M1 and a second control signal for the second switch M2. Preferably, the first control signal and the second control signal are used to control the switching of the first switch M1 and the second switch M2 such that the parallel resonant converter can be operated so that a controlled power can be provided to the load. Preferably, the second control signal is an inverse of the first control signal. This means that when the first control signal is high, i.e. the first switch M1 is closed, the second control signal is low, i.e. the second switch M2 is open and vice versa. A dead time may be present, which means that both the first control signal and the second control signal are low, i.e. both the first switch M1 and the second switch M2 are open.

The DC blocking capacitor may be used to block the DC part of the bus voltage Vb that will be provided to the switching node X when the first switch M1 is closed. An AC voltage is then then provided to the resonant tank having the inductor LS and capacitor C2, effectively resulting in an AC voltage across capacitor C2 and therefore also the first lighting load LED1 and the second lighting load LED2. A positive cycle of the AC voltage is for example provided to the first lighting load LED1, allowing the first lighting load LED1 to emit light. A negative cycle of the AC voltage that is provided to first lighting load LED1 is blocked such that the first lighting load will not be powered by the negative cycle. A negative cycle of the AC voltage is for example provided to the second lighting load LED2, allowing the second lighting load LED2 to emit light. A positive cycle of the AC voltage that is provided to the second lighting load LED2 is blocked such that the second lighting load will not be powered by the negative cycle. Because the first lighting load LED1 and the second load LED2 are directly coupled in parallel to the capacitor C2, which is used in the resonance tank, the parallel resonant converter can be made in a very simple design. No rectification circuit is needed and a buffer capacitor, which would normally be present can be omitted. An additional effect that is achieved by direct placing the first lighting load LED1 and the second lighting load LED2 in parallel with capacitor C2 is that the loads can be driven with different average currents.

When the first switch M1 and the second switch M2 are controlled with an identical duty cycle, the average current flowing through the first lighting load LED1 and the second lighting load LED2 will be the same. This means that when the first lighting loads LED1 is identical to the second lighting load LED2, the light output of both lighting loads will be the same. Preferably, the duty cycle of the first control signal and the second control signal is 0.5. A possible dead time may be taken into consideration. To achieve an approximate 0.5 duty cycle for the first control signal and the second control signal.

Figure 3A:
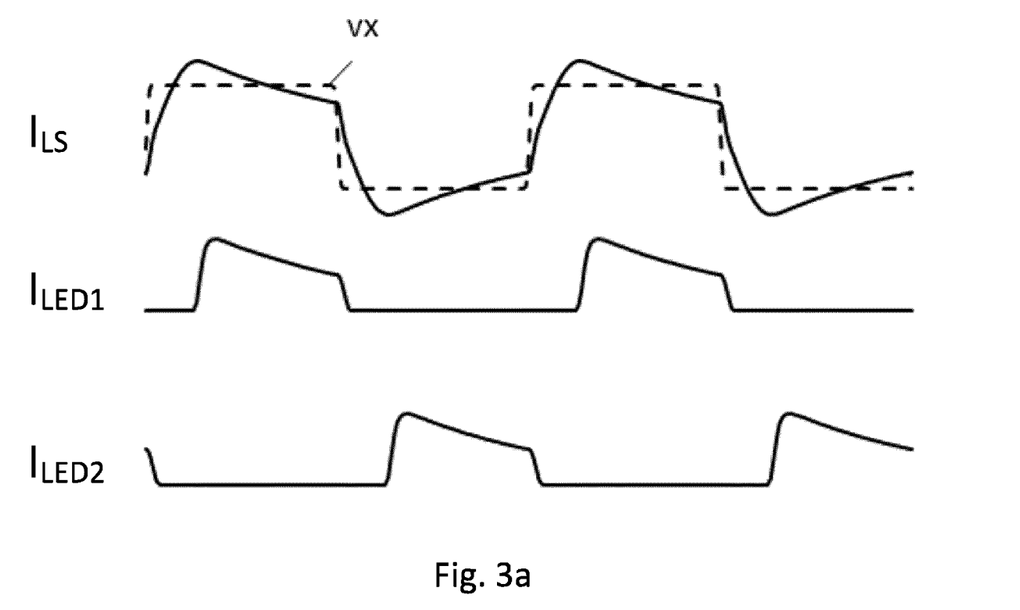
FIG. 3a shows waveforms of the resonant tank current and the first and second lighting load currents.
Figure 3B:
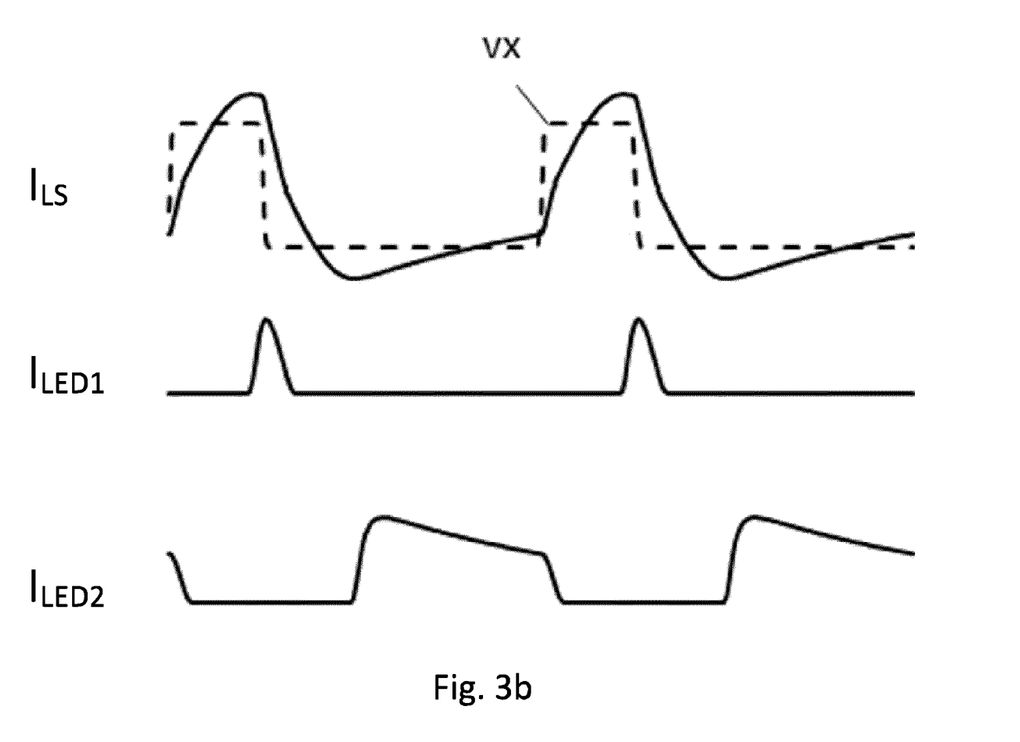
FIG. 3b shows additional waveforms of the resonant tank current and the first and second lighting load currents.

When the duty cycle of the first control signal differs from the second control signal, the average current flowing through the first lighting load LED1 will be different from the average current flowing through the second lighting load LED2. The effect of the change in duty cycle will be explained more in the context of FIG. 3.

Figure 2:
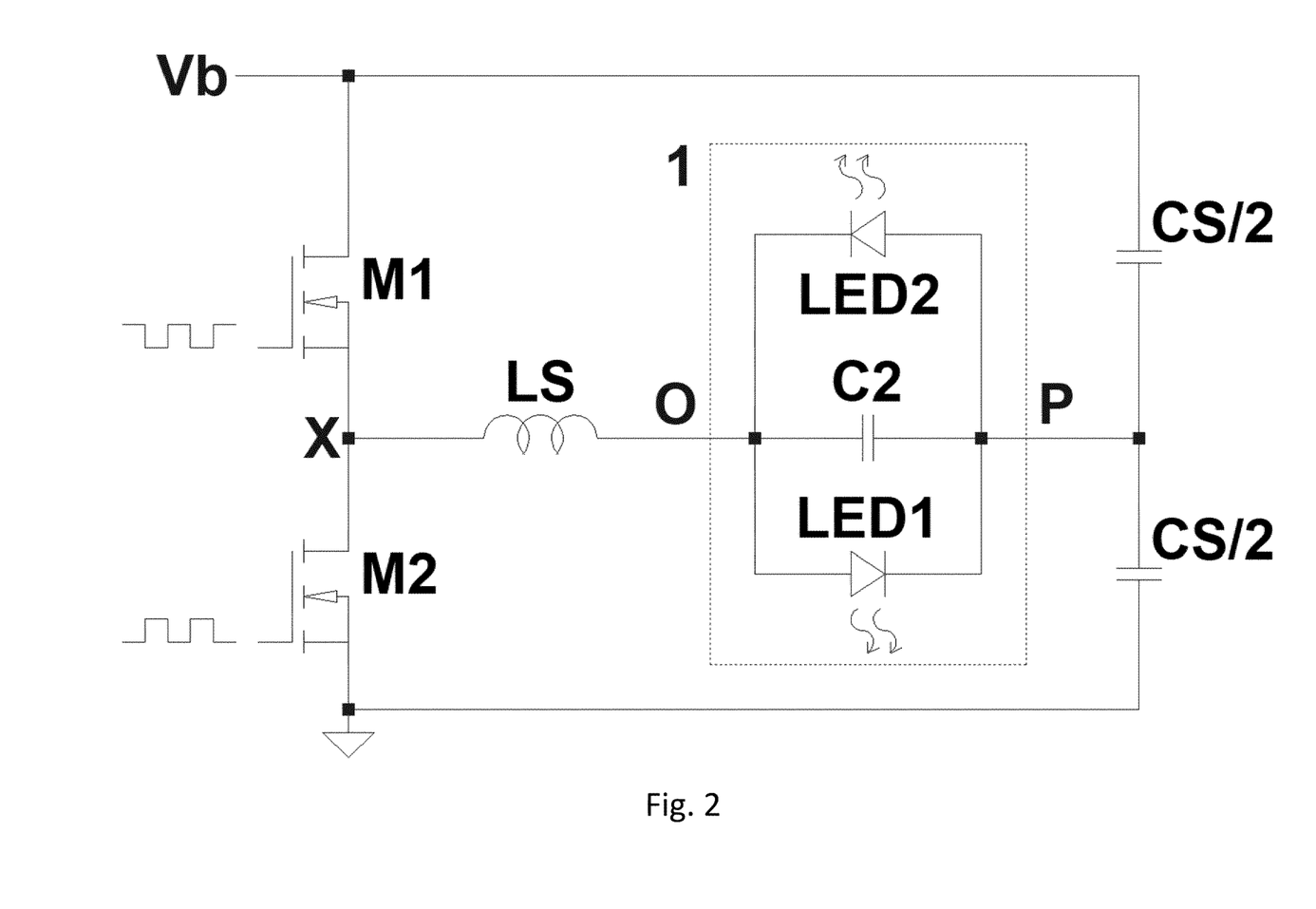
FIG. 2 shows another example of a lighting system according to the invention.

In FIG. 2, another example of a lighting system is provided. Similar as in FIG. 1, the lighting system has a converter in the form of a parallel resonant converter. A half bridge is coupled to the input node and has a first switch M1 coupled between the input node X and a switching node and a second switch M2 coupled between the switching node X and the return node. The inductor LS is coupled between the switching node X and the output node O. the DC blocking capacitor is in this example embodied as two capacitors CS/2. These two capacitors form the total DC blocking capacitance needed to block the DC voltage to the resonant tank of inductor LS and capacitor C2. The first DC blocking capacitor is coupled between the input node and a second input P, the second DC blocking capacitor is coupled between the second input P and the return node. Similar to FIG. 1, the load 1 has a has a first lighting load LED1 and a second lighting load LED2. In anti-parallel to this first lighting load LED1 is a second lighting load LED2 connected. The capacitor C2 is connected in parallel to the first lighting load LED1 and the second lighting load LED2. The load 1 is coupled between the first input O and the second input P. The controller may control the first switch M1 and the second switch M2 by providing the first control signal and the second control signal in a similar fashion as is done with the parallel resonant converter in FIG. 1.

In FIG. 3a, an example of a current to the lighting loads is provided at a predefined frequency and duty cycle.

In the first graph, the switching node voltage VX present at the switching node X is shown. The voltage represents a square wave voltage ranging between zero volts when the second switch M2 is closed and the bus voltage when the first switch M1 is closed. The current $I_{CS}$ flowing through the inductor LS is also provided to the load 1. The current is divided between the lighting load which is conductive and the capacitor C2. When the voltage across capacitor C2 is positive, a part of the current $I_{CS}$ will flow through the first lighting load LED1. When the voltage across capacitor C2 is negative, a part of the current $I_{CS}$ will flow through the second lighting load LED2.

The current flowing through the first lighting load LED1 is represented in the second graph. Here it can be seen that when the first switch M1 is closed, a current will flow through the first lighting load LED1. The current flowing through the second lighting load LED2 is represented in the third graph. Here it can be seen that when the second switch M2 is closed, a current will flow through the second lighting load LED2.

In the example provided, a duty cycle of 0.5 for the first switch M1 and the second switch M2 has been used. It can be seen that the current through the first lighting load LED1 is identical to the current through the second lighting load LED2.

In FIG. 3b, an example of a current to the lighting loads is provided at a predefined frequency and duty cycle. The duty cycle of the first control signal for the first switch M1 is smaller than the duty cycle the second control signal for the second switch M1. It can be seen in the first graph that the current through the inductor LS is not symmetrical, as well as the switching node voltage VX. This is because the first switch M1 is closed for a much shorter time than the second switch M2.

In the second graph, the current through the first lighting load LED1 is shown.

In the third graph, the current through the second lighting load LED2 is shown.

From the second and the third graph, it can be seen that the change in duty cycle of the first control signal and the second control signal results in a difference between the current through the first lighting load LED1 and the second lighting load LED2. The duty cycles can be used to regulate the current through the first lighting load LED1 and the second lighting load LED2 so that each lighting load can emit a desired light output. When the first lighting load LED1 emits a first color or color temperature and the second lighting load LED2 emits a second color or color temperature, a color mixing can be performed with the lighting system, allowing the lighting system to create different kind of lighting colors or color temperatures. The controller generates the first control signal and the second control signal with a desired duty cycle. In addition, the first control signal and the second control signal have a desired frequency. This frequency is preferably set at the resonance frequency of the resonance tank. The frequency can alternatively be altered so that the current distribution between the first lighting load LED1 and the capacitor C2 and the current distribution between the second lighting load LED2 and the capacitor C2 can be altered. This is mainly possible because the impedance of the capacitor C2 drops with an increase in frequency. At a higher frequency, the current through the first lighting load LED1 and the second lighting load LED2 will be reduced. The controller can therefore use the duty cycle and/or the frequency of the first control signal and the second control signal to change the average current flowing through the first lighting load LED1 and the second lighting load LED2.

Figure 4:
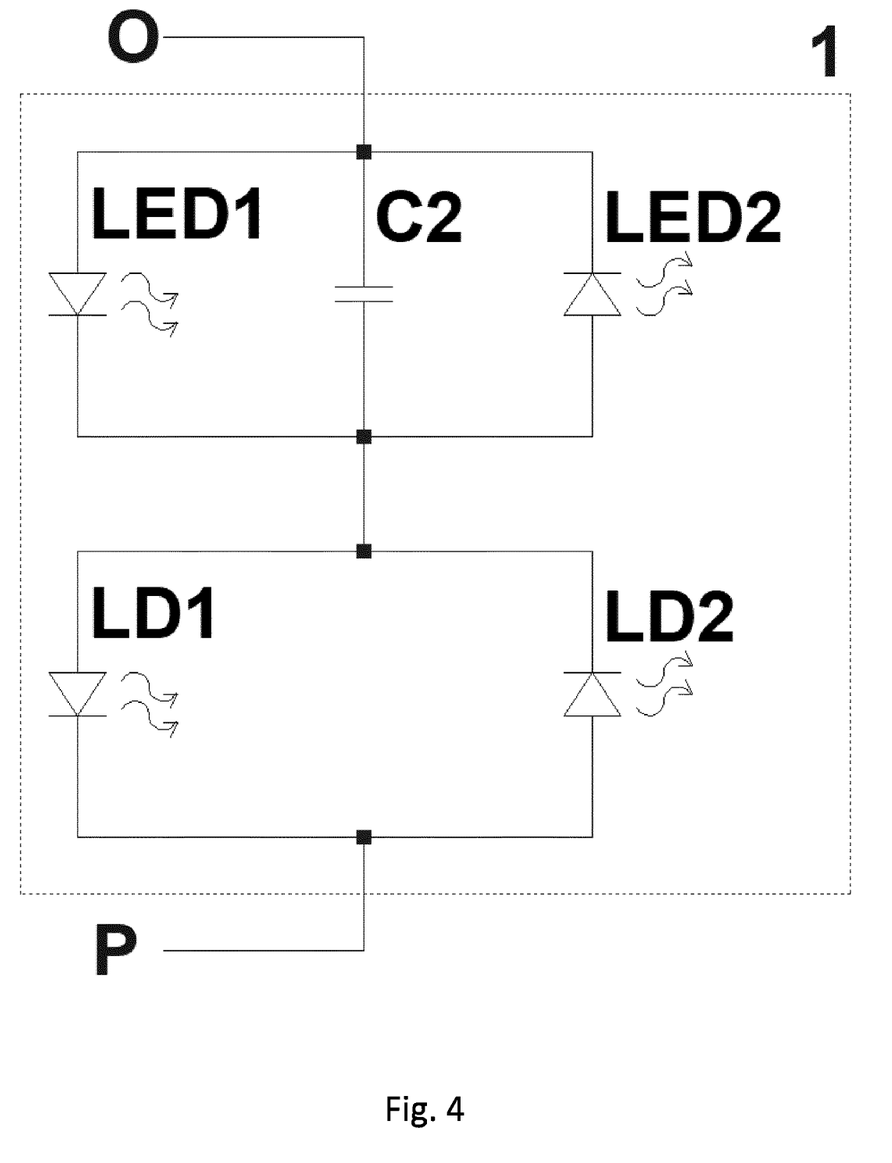
FIG. 4 shows an example of a load.

FIG. 4 shows an example of a load 1 that can be connected to the parallel resonant converter. The load 1 has the first lighting load LED1, the second lighting load LED2 and the capacitor C2 as described in the previous examples, which is also referred to as the first load part. In addition, a third lighting load LD1 and a fourth lighting load LD2 are coupled in anti-parallel. This anti-parallel arrangement is coupled between the first load part and the second input P. Because the third lighting load LD1 and the fourth lighting load LD2 do not have a capacitor in parallel, the frequency behavior of these loads is different than for the first lighting load LED1 and the second lighting load LED2. Alternatively, the third lighting load LD1 and the fourth lighting load LD2 may have a capacitor coupled in parallel but with a different value compared to capacitor C2, so that the frequency behavior of the third lighting load LD1 and the fourth lighting load LD2 is different than the frequency behavior of the first lighting load LED1 and the second lighting load LED2.

In the example provided, during a positive cycle of the AC voltage across the capacitor C2, the first lighting load LED1 and the third lighting load LD1 can conduct a current. During a negative voltage at the capacitor C2, the second lighting load LED2 and the fourth lighting load LD2 can conduct a current. The controller can set the duty cycle and the frequency of the first control signal and the second control signal. Controlling the duty cycles of the first control signal and the second control signal will result in a current distribution between the positive cycle of the AC voltage and the negative cycle of the AC voltage. For example, the duty cycle of the first control signal can modify the current that flows through the first lighting load LED1 and the third lighting load LD1, while the duty cycle of the second control signal can modify the current that flows through the second lighting load LED2 and the fourth lighting load LD2.

The frequency of the first control signal and the second control signal can also be controlled. Changing the frequency will cause the inductor current $I_{LS}$ through the inductor LS to vary.

The current flowing through the third lighting load LD1 and the fourth lighting load LD2 is not influenced by a changing frequency, besides the aforementioned current change in the inductor LS. The current through the first lighting load LED1 is affected by the changing frequency because the current distribution between the first lighting load LED1 and the capacitor C2 is frequency dependent.

The current through the second lighting load LED2 is affected by the changing frequency because the current distribution between the second lighting load LED2 and the capacitor C2 is frequency dependent.

If desired, the current change of the inductor current ILS through the inductor LS can be compensated as will be described further on in more detail.

Figure 5A:
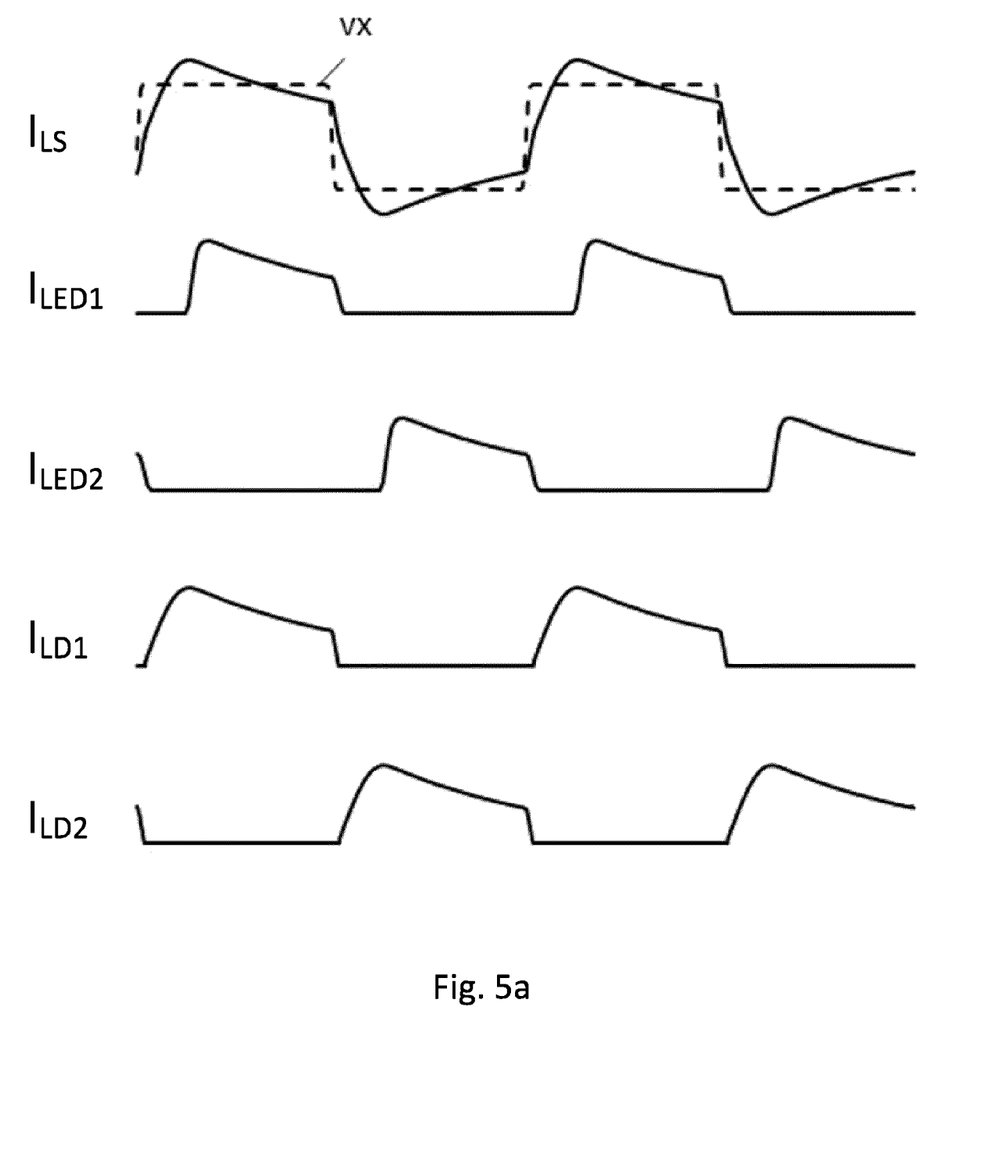
FIG. 5a shows waveforms of the resonant tank current and the first, second, third and fourth lighting load currents.

In FIG. 5a, an example of a current to the lighting loads is provided at a predefined frequency and duty cycle. In this example, the duty cycle of the first control signal and the second control signal is set at 0.5 as can be shown in the first graph.

The frequency and duty cycle control of the first control signal and the second control signal provide a current for the lighting loads as shown in the second to fifth graphs.

In the second graph, the current of the first lighting load LED1 is shown.

In the third graph, the current of the second lighting load LED2 is shown.

Because of the duty cycle of the first control signal and the second control signal being equal, the currents through the first lighting load LED1 and the second lighting load LED2 are equal.

In the fourth graph, the current through the third lighting load LD1 is shown.

In the fifth graph, the current through the fourth lighting load LD2 is shown.

Because of the duty cycle of the first control signal and the second control signal being equal, the currents through the third lighting load LD1 and the fourth lighting load LD2 are equal.

Because of the chosen frequency with which the controller generates the first control signal and the second control signal, a difference between the currents of the first lighting load LED1 and the third lighting load LD1 and a difference between the currents of the second lighting load LED2 and the fourth lighting load LD2 occurs. The difference in current will flow through capacitor C2. Of course, the frequency can be chosen such that all the lighting loads receive the same amount of current.

Figure 5B:
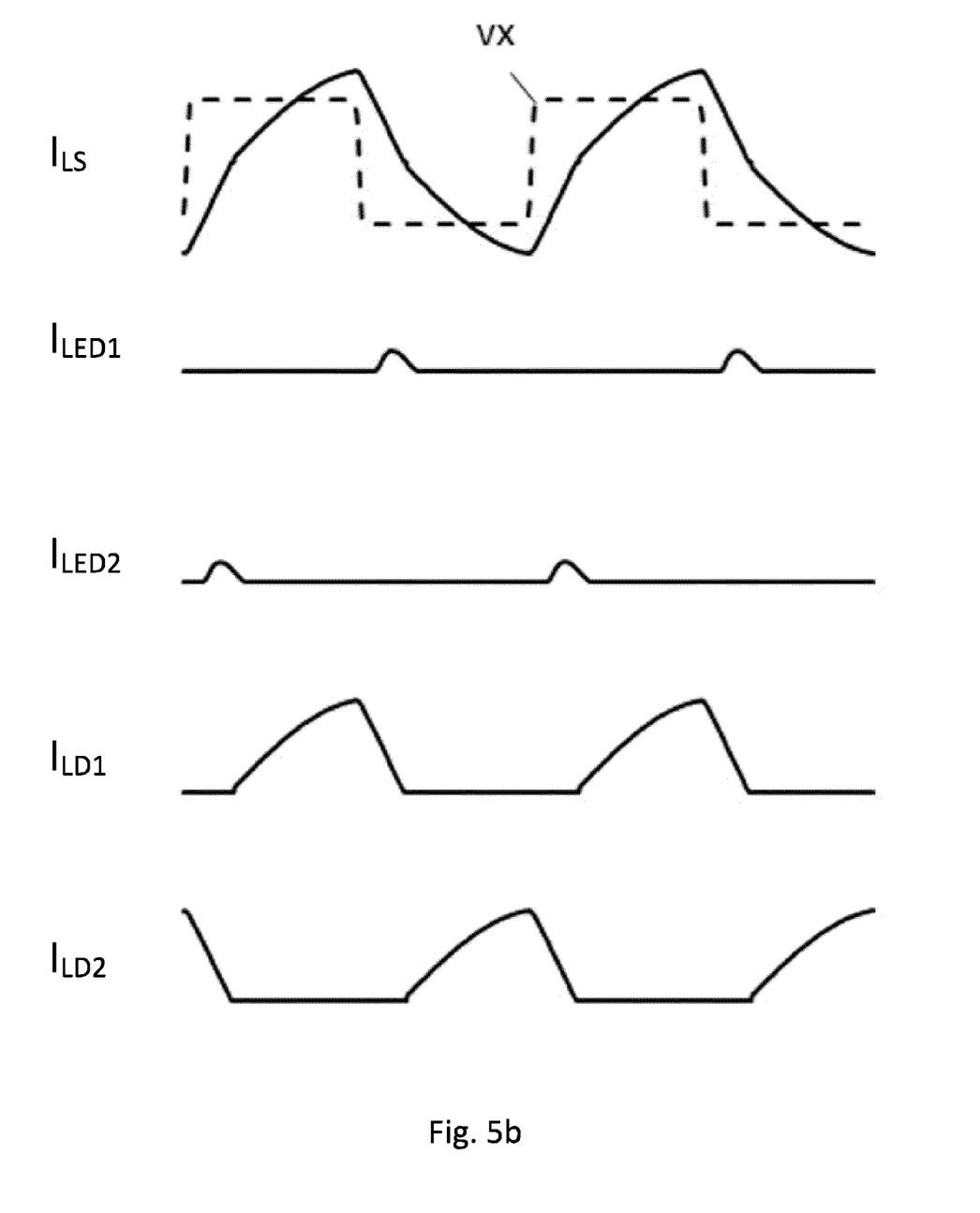
FIG. 5b shows additional waveforms of the resonant tank current and the first, second, third and fourth lighting load currents.

In FIG. 5b, an example of a current to the lighting loads is provided at a predefined frequency and duty cycle. In this example, the duty cycle of the first control signal and the second control signal is set at 0.5 as can be shown in the first graph.

In this example, the frequency is larger than the frequency that is used in FIG. 5a.

In the second graph, the current of the first lighting load LED1 is shown.

In the third graph, the current of the second lighting load LED2 is shown.

because of the larger frequency, the current through the first lighting load LED1 and the second lighting load LED2 has been reduced drastically. More current flows through capacitor C2.

Because of the duty cycle of the first control signal and the second control signal being equal, the currents through the first lighting load LED1 and the second lighting load LED2 are equal.

In the fourth graph, the current through the third lighting load LD1 is shown.

In the fifth graph, the current through the fourth lighting load LD2 is shown.

Because of the chosen frequency with which the controller generates the first control signal and the second control signal, a difference between the currents of the first lighting load LED1 and the third lighting load LD1 and a difference between the currents of the second lighting load LED2 and the fourth lighting load LD2 occurs. The difference in current will flow through capacitor C2, which is in this case significantly larger than in the situation as shown in FIG. 5a.

Because of the duty cycle of the first control signal and the second control signal being equal, the currents through the third lighting load LD1 and the fourth lighting load LD2 are equal.

Because the frequency increase reduces the current through the inductor LS, the current through the third lighting load LD1 and the fourth lighting load LD2 is also reduced, but not as much as in the first lighting load LED1 and the second lighting load LED2. As can be seen from FIGS. 5a and 5b, an increase in the frequency of the first control signal and the second control signal results in a reduction of the current through the first lighting load LED1 and the second lighting load LED2, without changing the current through the third lighting load LD1 and the fourth lighting load LD2 too much.

Figure 5C:
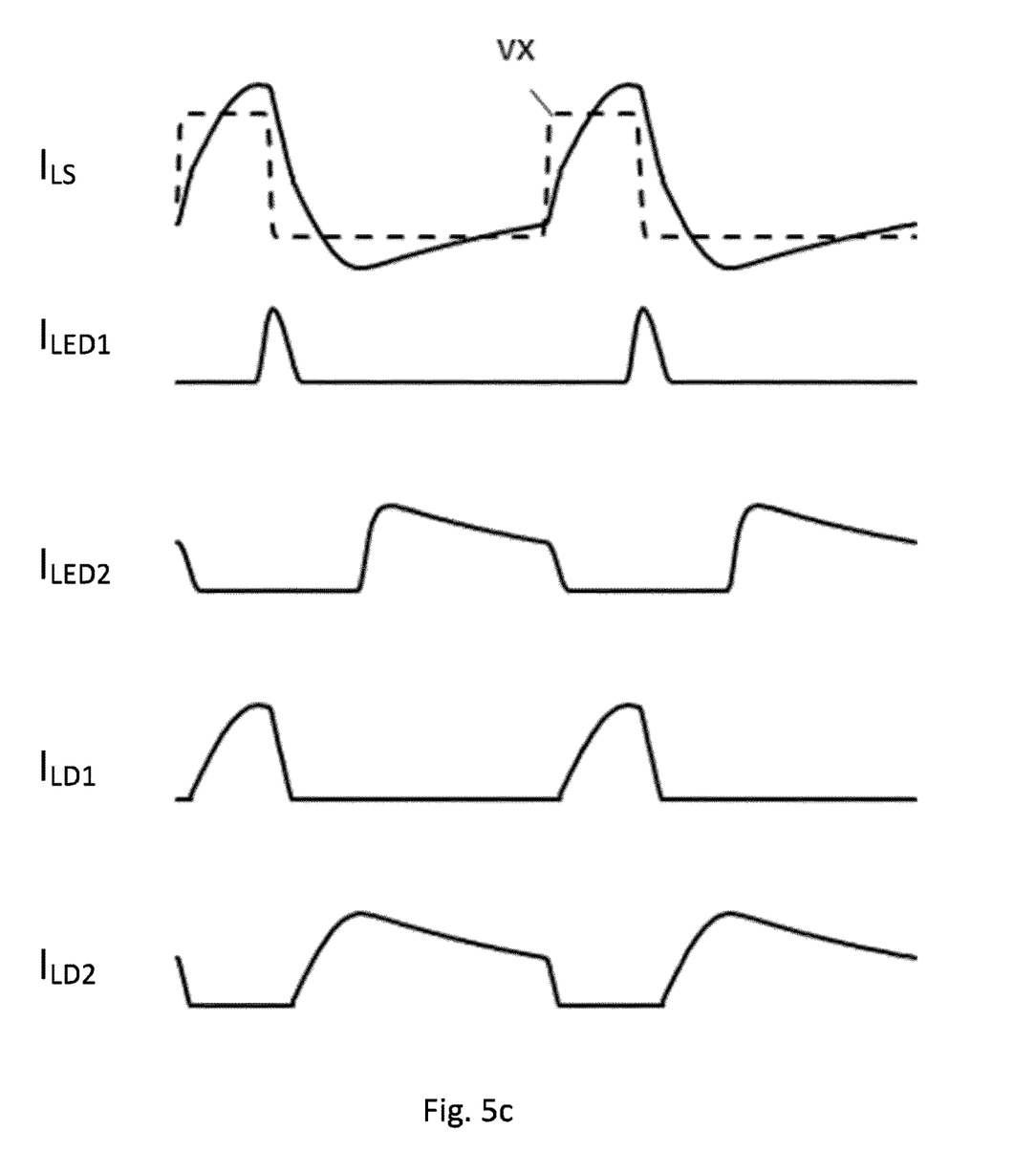
FIG. 5c shows additional waveforms of the resonant tank current and the first, second, third and fourth lighting load currents.

In FIG. 5c, an example of a current to the lighting loads is provided at a predefined frequency and duty cycle. In this example, the duty cycle of the first control signal and the second control signal is smaller than the duty cycle the second control signal. It can be seen in the first graph that the current through the inductor LS is not symmetrical, as well as the switching node voltage VX. This is because the first switch M1 is closed for a much shorter time than the second switch M2.

In the second graph, the current through the first lighting load LED1 is shown.

In the third graph, the current through the second lighting load LED2 is shown.

From the second and the third graph, it can be seen that the change in duty cycle of the first control signal and the second control signal results in a difference between the current through the first lighting load LED1 and the second lighting load LED2. In addition.

In the fourth graph, the current through the third lighting load LD1 is shown.

In the fifth graph, the current through the fourth lighting load LD2 is shown.

From the fourth and the fifth graph, it can be seen that the change in duty cycle of the first control signal and the second control signal results in a difference between the current through the third lighting load LD1 and the fourth lighting load LD2. In this example, the current through the fourth lighting load LD2 is larger than the current through the third lighting load LD1.

In this example, the current through the second lighting load LED2 and the fourth lighting load LD2 is larger than the current through the first lighting load LED1 and the third lighting load LD1 respectively.

Changing the duty cycle of the first control signal and the second control signal will allow the current through the lighting loads to be changed.

Concluding from the FIGS. 5a, 5b and 5c, it is clear to the skilled person that a duty cycle or frequency control of the first control signal and the second control signal allow the current through the lighting loads to be configured. The combination of the duty cycle and frequency control of the first control signal and the second control signal allows the current for each lighting load to be set at a desired level.

Figure 6:
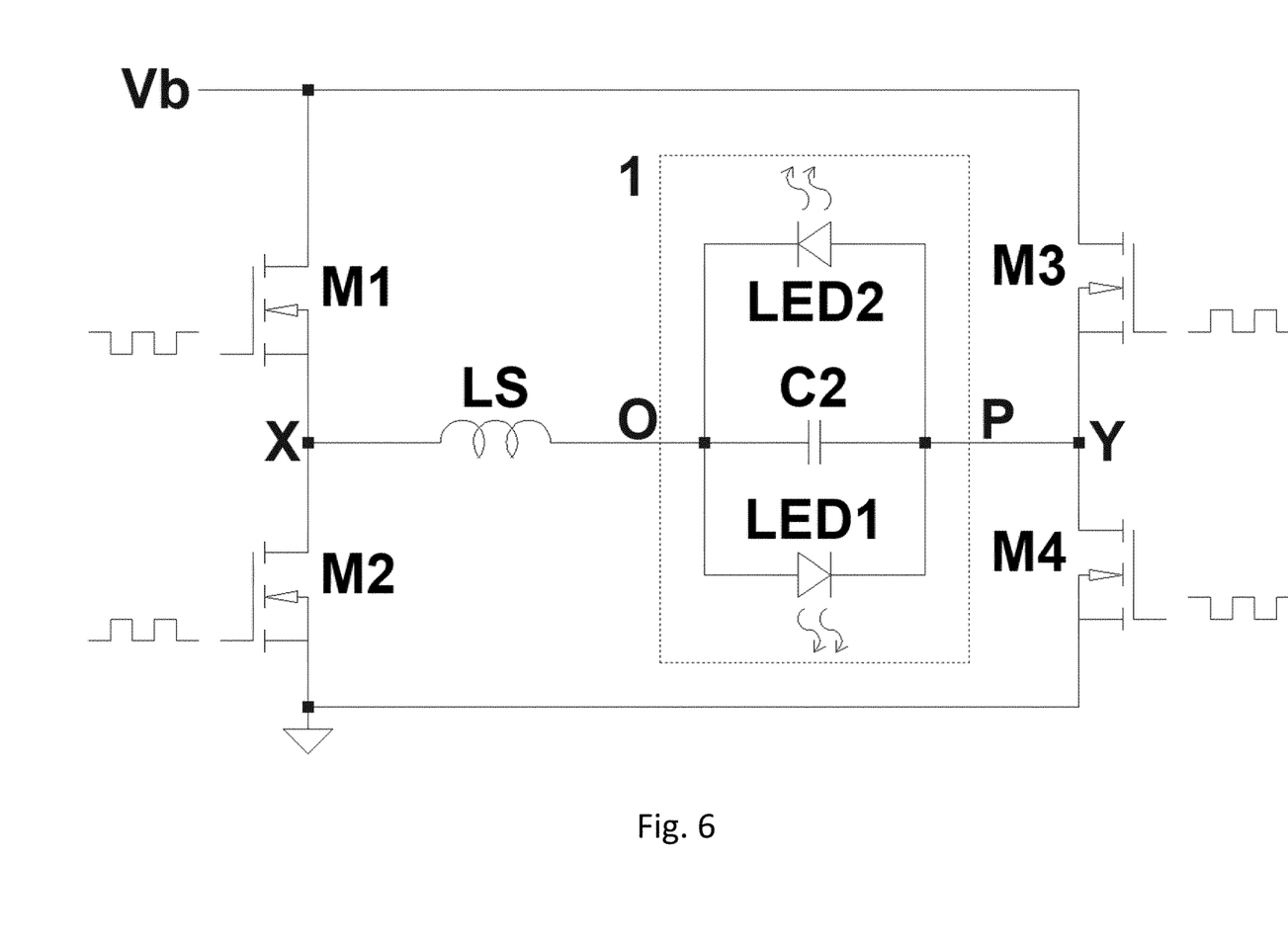
FIG. 6 shows another example of a lighting system according to the invention.

FIG. 6 shows a further example of a lighting system. The parallel resonant converter now has a full bridge instead of a half bridge. The parallel resonant converter has an input node at which the parallel resonant converter receives a bus voltage Vb. The ground reference in the figure represents the return node. A half bridge is coupled to the input node. The half bridge has a first switch M1 coupled between the input node X and a switching node and a second switch M2 coupled between the switching node X and the return node. The inductor LS is coupled between the switching node X and the output node O. In this example, no DC blocking capacitor is required. Instead, a further half bridge is used to provide an AC voltage to the resonant tank. The further half bridge has a third switch M3 coupled between the input node and a further switching node Y and a fourth switch M4 coupled between the further switching node Y and the return node. The further switching node Y is coupled to the second input P. The load 1 is coupled between the first input O and the second input P. The controller now also provides a third control signal for the third switch M3 and a fourth control signal for the fourth switch M4. Preferably, the first switch M1 and the fourth switch M4 are controlled with a similar control signal. The second switch M2 and the third switch M3 are then also controlled with a similar control signal. By switching the switches in this configuration, the DC blocking capacitor may be omitted, while allowing a larger voltage to be present at the load at a given bus voltage. The first switch M1 and the fourth switch M4 may have a control signal that is the inverse of the control signal of the second switch M2 and the third switch M3.

Figure 7:
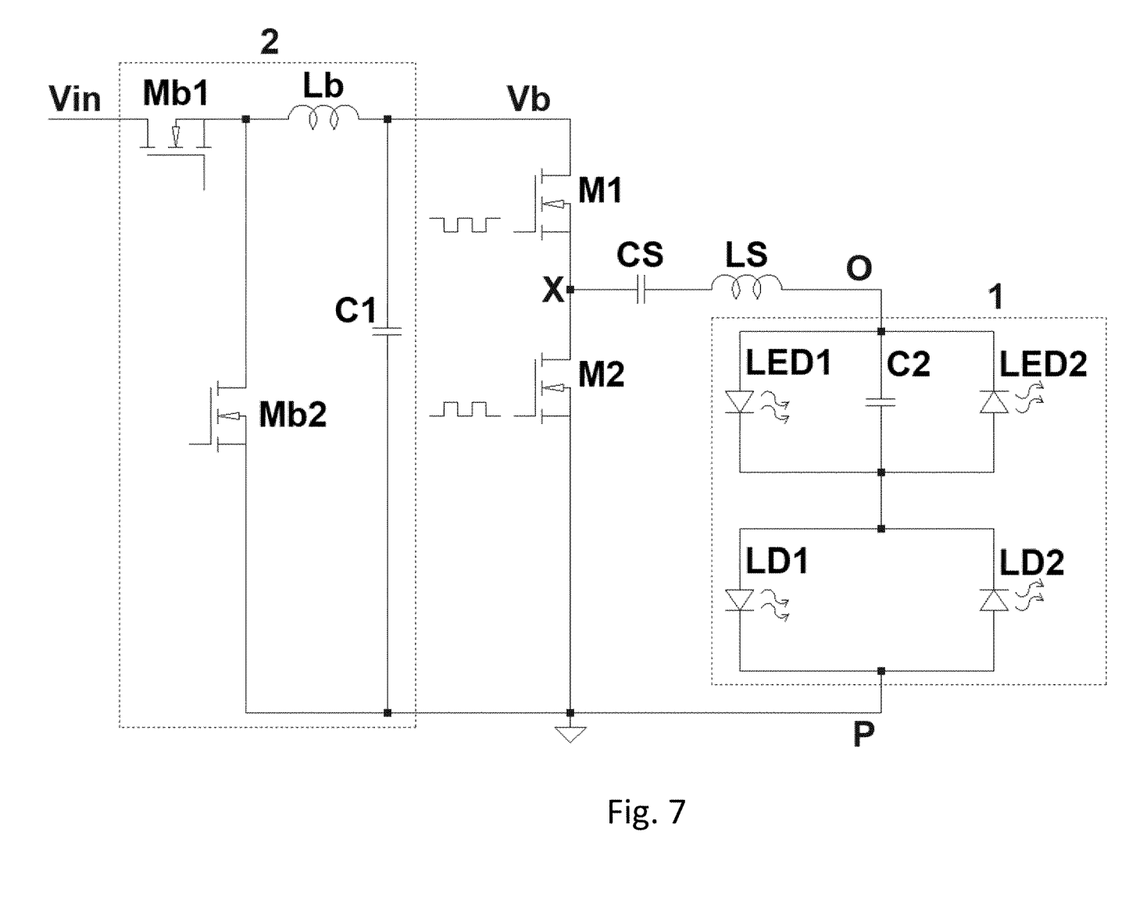
FIG. 7 shows another example of a lighting system according to the invention.

FIG. 7 shows an example of a further lighting system. The parallel resonant converter as shown in any of the previous examples receives a bus voltage Vb via the input node. The example provided in FIG. 7 shows that this bus voltage Vb can be provided using another switched mode power supply (SMPS) which is used as a pre-converter 2. In the example provided, the pre-converter 2 is a buck converter, more precisely a synchronous buck converter. The buck converter may receive a voltage from a power source. The power source may be any type of power source that is commonly used such as a mains AC input power source or a DC source such as a battery source.

The buck is merely one example of an SMPS and the skilled person understands that any type of SMPS may be used, depending on the desired bus voltage Vb and the power source. The pre-converter can be used to keep the bus voltage Vb at a steady voltage level.

As mentioned before, changing the frequency of the control signals of the switches impacts the inductor current $I_{LS}$ through the inductor LS as well as the current through the lighting loads. To reduce or negate the impact of the frequency on the inductor current $I_{LS}$, the bus voltage Vb can be changed in amplitude.

The pre-converter 2 can be configured such that when the frequency of the control signals for the switches of the parallel resonant converter increases, the bus voltage Vbus also increases and vice versa.

The pre-converter can be used as a third control parameter for dimming the load. The first parameter could be seen as the frequency, the second parameter as the duty cycle and the third parameter as the bus voltage, which is controlled by the pre-converter.

Preferably, the pre-converter 2 provides a galvanic isolation between the power source and the bus voltage Vb.

Figure 8:
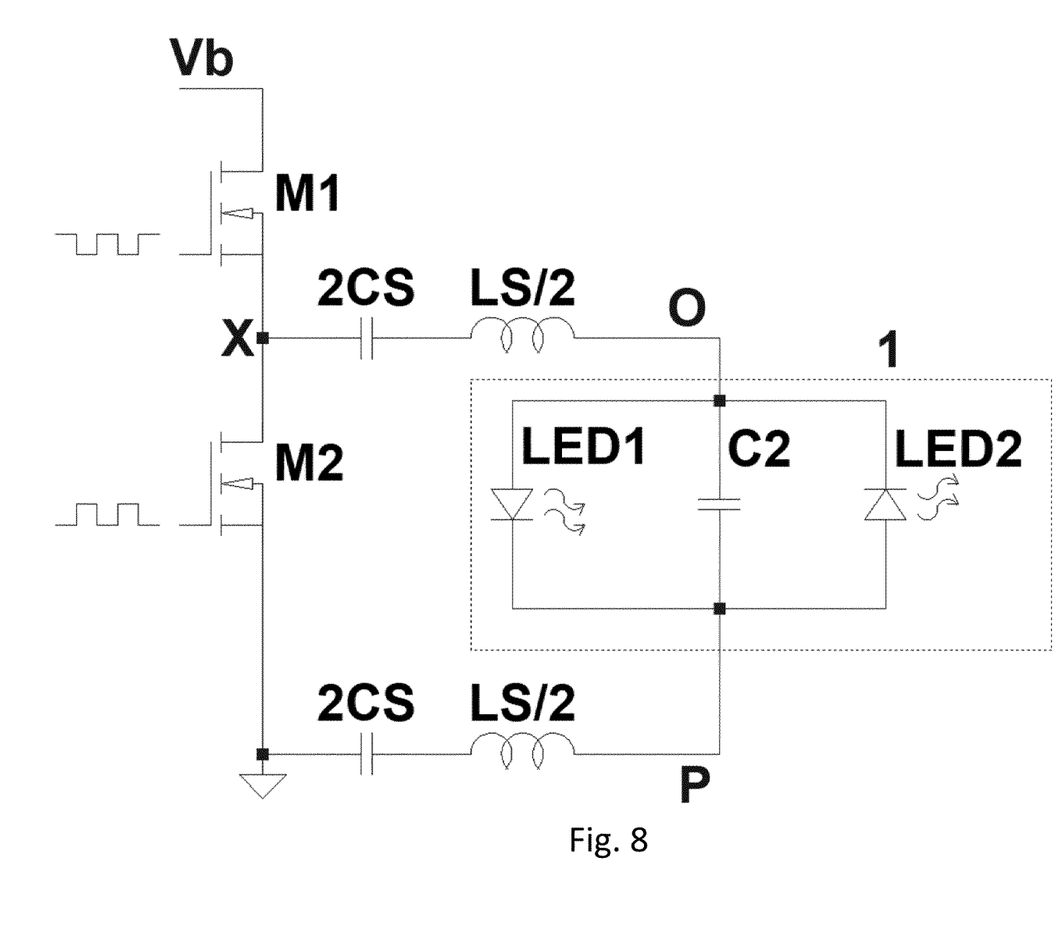
FIG. 8 shows another example of a lighting system according to the invention.

FIG. 8 shows a further example of a lighting system. In the lighting system, the resonant tank has been altered with respect to the example provided in FIG. 1. The DC blocking capacitor is split up in two capacitors. The first DC blocking capacitor is placed between the switching node X and the inductor LS. The second DC blocking capacitor is placed between the ground node and the second input P. The inductor LS may also be split in two inductors, where the first inductor is placed between the first DC blocking capacitor and the first input O and the second inductor is placed between the second DC blocking capacitor and the second input.

Preferably, the DC blocking capacitors are capacitors that can be used to provide a galvanic isolation, such as a Y-cap. If the inductor is split in two inductors as defined above, the two inductors may be inductively coupled such that they can provide a common mode interference suppression.

The first and second DC blocking capacitors may be designed such that they for capacitor plates that can be placed together to form a capacitor. This allows a physical separation between the components on one end of the DC blocking capacitors and the components on the other end of the DC blocking capacitors. This may for example provide a solution for easy replaceable loads, where the DC blocking capacitors provide a capacitive coupling between the load and the power supply for the load.

In the examples provided in the description, the first lighting load LED1 and the second lighting load LED2 may be LED lighting loads. The third lighting load LD1 and the fourth lighting load LD2 may be laser elements. The skilled person understands that these examples are merely examples providing a preferred configuration of lighting loads. The skilled person understands that any kind of lighting load configuration can be selected. Any of the four lighting loads may be an LED load or a laser element.

In the example where the first and second lighting load are LEDs and the third and fourth lighting loads are laser diodes, the capacitor C2 may be an integral part of the first and/or second lighting load because the LED may have a larger capacitance than the laser diode.

Under an LED lighting load, any kind of LED load can be understood, where the LEDs can provide any kind of desired color or color temperature.

Under a laser element, any kind of laser is understood, such as laser diodes or vertical-cavity surface-emitting laser, VCSELs, which allows any kind of desired light color or color temperature to be provided.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A lighting system comprising:
 a parallel resonant converter comprising:
 an input node for receiving a bus voltage;

an output node;
a half bridge comprising:
  a first switch coupled between the input node and a switching node; and
  a second switch coupled between the switching node and a return node;
a controller adapted to provide a first control signal to the first switch and a second control signal to the second switch;
an inductor coupled between the switching node and the output node;
a load coupled to the output node and comprising a first load part, the first load part comprising:
a first lighting load;
a capacitor coupled in parallel with the first lighting load; and
a second lighting load coupled in anti-parallel with the first lighting load
a third lighting load, and
a fourth lighting load, coupled in anti-parallel with the third lighting load,
wherein the third lighting load and the fourth lighting load are coupled in series with the first load part, wherein the controller is arranged to control a frequency of the first control signal and the second control signal while keeping a duty cycle of the first control signal and the second control signal constant,
  wherein the third lighting load and the fourth lighting load do not have a capacitor in parallel such that the frequency behavior of the third lighting load and the fourth lighting load are different than of the first lighting load and the second lighting load, or wherein the third lighting load and the fourth lighting load have a capacitor coupled in parallel with a different value compared to the capacitor, such that the frequency behavior of the third lighting load and the fourth lighting load is different than the frequency behavior of the first lighting load and the second lighting load.

2. The lighting system according to claim 1, wherein the duty cycle of the first control signal and the second control signal is set at 0.5.

3. The lighting system according to claim 1, wherein the controller is arranged to control a duty cycle of the first control signal and the second control signal.

4. The lighting system according to claim 1, wherein the first lighting load (LED1) provides a first color or color temperature and the second lighting load provides a second similar color or similar color temperature.

5. The lighting system according to claim 1, wherein the first lighting load provides a first color and/or a first color temperature and the second lighting load provides a second color which is different from the first color and/or a second color temperature which is different from the first color temperature.

6. The lighting system according to claim 1, wherein the third lighting load provides a first color or color temperature and the fourth lighting load provides a second similar color or similar color temperature.

7. The lighting system according to claim 1, wherein the third lighting load provides a first color and/or a first color temperature and the fourth lighting load provides a second color which is different from the first color and/or a second color temperature which is different from the first color temperature.

8. The lighting system according to claim 1, wherein the first lighting load and second lighting load comprise light emitting diodes, LEDs.

9. The lighting system according to claim 1, wherein the third lighting load and the fourth lighting load comprise laser elements.

10. The lighting system according to claim 1, wherein the parallel resonant converter further comprises a further half bridge comprising:
  a third switch coupled between the input node and a further switching node; and
  a fourth switch coupled between the further switching node and the return node,
  wherein the further switching node is coupled to a second input,
  wherein the controller is adapted to provide a third control signal to the third switch and a fourth control signal to the fourth switch.

11. The lighting system according to claim 1, wherein the parallel resonant converter further comprises:
  a first DC blocking capacitor coupled between the inductor and the switching node;
  a second DC blocking capacitor coupled between a second input and the return node.

12. The lighting system according to claim 1 further comprising a pre-converter adapted to:
  receive a voltage from an external power source;
  convert the voltage to the bus voltage such that the bus voltage is a regulated bus voltage;
  provide the regulated bus voltage to the input node as the bus voltage.

13. The lighting system according to claim 12, wherein the pre-converter is adapted to regulate the bus voltage such that the current provided to the inductor is constant independent of a frequency change of the first control signal and the second control signal.

* * * * *